(12) United States Patent
Penner

(10) Patent No.: US 8,234,569 B2
(45) Date of Patent: Jul. 31, 2012

(54) APPARATUS AND METHOD FOR DEFINING AND PROCESSING PUBLICATION OBJECTS

(75) Inventor: Terry Wayne Penner, Burnaby (CA)

(73) Assignee: Business Objects Software Ltd., Dublin (IE)

( * ) Notice: Subject to any disclaimer, the term of this patent is extended or adjusted under 35 U.S.C. 154(b) by 1193 days.

(21) Appl. No.: 11/680,547

(22) Filed: Feb. 28, 2007

(65) Prior Publication Data
US 2008/0208906 A1 Aug. 28, 2008

(51) Int. Cl.
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. ............... 715/255; 715/200; 715/235
(58) Field of Classification Search .......... 715/200, 715/255, 235; 705/1, 9, 50; 717/115; 707/104.1; 709/206
See application file for complete search history.

(56) References Cited

U.S. PATENT DOCUMENTS

| 6,249,807 | B1 * | 6/2001 | Shaw et al. ............ 709/206 |
| 7,107,284 | B1 * | 9/2006 | Betz et al. ............ 707/999.104 |
| 7,139,686 | B1 * | 11/2006 | Critz et al. ............ 703/2 |
| 7,266,767 | B2 * | 9/2007 | Parker ............ 715/255 |
| 738,020 | A1 | 5/2008 | Vasey |
| 752,689 | A1 | 5/2009 | Miller |
| 7,584,425 | B2 * | 9/2009 | Nader et al. ............ 715/255 |
| 2002/0073121 | A1 | 6/2002 | Sano et al. |
| 2002/0091609 | A1 | 7/2002 | Markowski |
| 2002/0095399 | A1 * | 7/2002 | Devine et al. ............ 707/1 |
| 2002/0099717 | A1 * | 7/2002 | Bennett ............ 707/102 |
| 2002/0107889 | A1 * | 8/2002 | Stone et al. ............ 707/513 |
| 2002/0194131 | A1 | 12/2002 | Dick |
| 2003/0041303 | A1 | 2/2003 | Milton |
| 2003/0080999 | A1 | 5/2003 | Stone et al. |

(Continued)

FOREIGN PATENT DOCUMENTS

WO  PCT/US08/70003  10/2008

OTHER PUBLICATIONS

International Search Report and Written Opinion for International Application No. PCT/US2008/052160, mailed on May 1, 2008, 7 pages.

(Continued)

*Primary Examiner* — Kyle Stork
*Assistant Examiner* — Nicholas Hasty
(74) *Attorney, Agent, or Firm* — Mintz, Levin, Cohn, Ferris, Glovsky and Popeo, P.C.

(57) ABSTRACT

A computer readable storage medium includes executable instructions to create a publication object, associate a set of report templates with the publication object, and define a set of recipients for the publication object. A format and a destination for each report template associated with the publication object is defined. A delivery rule for the publication object is also defined, where the delivery rule specifies a condition for delivery of distinct reports to the set of recipients.

7 Claims, 11 Drawing Sheets

U.S. PATENT DOCUMENTS

| | | | |
|---|---|---|---|
| 2003/0126275 A1 | 7/2003 | Mungavan et al. | |
| 2003/0154177 A1* | 8/2003 | Holland et al. | 706/60 |
| 2003/0204365 A1* | 10/2003 | Chen et al. | 702/155 |
| 2003/0229543 A1 | 12/2003 | Zimmerman et al. | |
| 2004/0049445 A1 | 3/2004 | Kishore | |
| 2004/0128613 A1* | 7/2004 | Sinisi | 715/500 |
| 2004/0130751 A1 | 7/2004 | Hirtenreiter et al. | |
| 2004/0133542 A1 | 7/2004 | Doerksen et al. | |
| 2004/0205656 A1 | 10/2004 | Reulein et al. | |
| 2004/0230508 A1 | 11/2004 | Minnis et al. | |
| 2005/0050442 A1 | 3/2005 | Pope et al. | |
| 2005/0114308 A1* | 5/2005 | Hyland et al. | 707/3 |
| 2005/0120298 A1 | 6/2005 | Petrujkic | |
| 2005/0125728 A1 | 6/2005 | Peiro et al. | |
| 2005/0166142 A1 | 7/2005 | Mise et al. | |
| 2005/0185212 A1 | 8/2005 | Gauthier | |
| 2005/0210376 A1 | 9/2005 | Zirngibl et al. | |
| 2005/0278533 A1 | 12/2005 | Mayer | |
| 2005/0289461 A1 | 12/2005 | Amado et al. | |
| 2006/0031746 A1 | 2/2006 | Toepfer et al. | |
| 2006/0031762 A1 | 2/2006 | Takashima | |
| 2006/0041443 A1 | 2/2006 | Horvath | |
| 2006/0048096 A1 | 3/2006 | Jiang et al. | |
| 2006/0129924 A1 | 6/2006 | Nelson et al. | |
| 2006/0136307 A1 | 6/2006 | Hays et al. | |
| 2006/0179320 A1 | 8/2006 | Berringer et al. | |
| 2006/0242555 A1 | 10/2006 | Lapstun et al. | |
| 2007/0016785 A1 | 1/2007 | Guay et al. | |
| 2007/0083429 A1 | 4/2007 | Kraft | |
| 2007/0089053 A1 | 4/2007 | Uhlig et al. | |
| 2007/0156590 A1 | 7/2007 | Yoon et al. | |
| 2007/0214218 A1 | 9/2007 | Ward et al. | |
| 2007/0244853 A1 | 10/2007 | Schneider et al. | |
| 2007/0276754 A1 | 11/2007 | Parmelee et al. | |
| 2007/0277042 A1 | 11/2007 | Dietl | |
| 2008/0028300 A1 | 1/2008 | Krieger et al. | |
| 2008/0059494 A1 | 3/2008 | Schuessler et al. | |
| 2009/0076954 A1 | 3/2009 | Carmody et al. | |
| 2009/0119133 A1 | 5/2009 | Yeransian et al. | |

OTHER PUBLICATIONS

Norrie, "Content Publishing Framework for Interactive Paper Documents." DocEng '05, pp. 187-196(Nov. 2-4, 2005).

Tufte, "Merge As a Lattice-Join of XML Documents." Proc. 28th VLDB Conf. Hong Kong, China (2002).

Brown et al., Context-Aware Retrieval: Exploring a New Environment for Information Retrieval and Information Filtering, Google 2001, pp. 253-263.

Marx et al, CLUES: Dynamic Personalized Messge Filtering, ACM 1996, pp. 113-121.

Wilbur et al., The GovStat Content Delivery Template (CDT) for Creating Explanatory Animations, ACM 2004, pp. 1-2.

* cited by examiner

FIG. 9

APPARATUS AND METHOD FOR DEFINING AND PROCESSING PUBLICATION OBJECTS

BRIEF DESCRIPTION OF THE INVENTION

This invention relates generally to data retrieval and processing. More particularly, this invention relates to processing and publishing reports and other documents.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems, such as relational databases or On Line Analytic Processing (OLAP) systems used to collect, store, and manage raw data.

There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and, formatting, transforming and/or presenting external data.

A report is specifically designed to facilitate working with external data sources. In addition to information regarding external data source connection drivers, the report may specify advanced filtering of data, information for combining data from different external data sources, information for updating join structures and relationships in report data, and instructions including logic to support a more complex internal data model (that may include additional constraints, relationships, and metadata).

In contrast to a spreadsheet type application, a report generation tool is generally not limited to a table structure but can support a range of structures, such as sections, cross-tables, synchronized tables, sub-reports, hybrid charts, and the like. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets applications generally work within a looping calculation model, whereas a report generation tools may support a range of calculation models. Although there may be an overlap in the function of a spreadsheet document and a report document, the applications used to generate these documents contain instructions with express different assumptions concerning the existence of an external data source and different logical approaches to interpreting and manipulating imported data.

Commercially available reporting products have included tools for processing and distributing reports. For example, Business Objects Enterprise™ from Business Objects Americas of San Jose, Calif. includes features for scheduling multiple reports simultaneously so that they are processed together, and delivered together to a specified recipient. Other available reporting products include features for processing a single report in a fixed format and conditionally distributing the report to multiple users.

It would be desirable to provide a business intelligence tool for simplifying and facilitating distribution of reports and other documents to a variety of business intelligence users and in a variety of formats. It would also be desirable to provide a business intelligence tool to allow centrally coordinated conditional control of the delivery of reports and other documents to a variety of business intelligence users.

SUMMARY OF INVENTION

The invention includes a computer readable storage medium with executable instructions to create a publication object, associate a set of report templates with the publication object, and define a set of recipients for the publication object. A format and a destination for each report template associated with the publication object is defined. A delivery rule for the publication object is also defined, where the delivery rule specifies a condition for delivery of distinct reports to the set of recipients.

The invention also includes a computer implemented method of creating a publication object, associating a plurality of report templates with the publication object, defining a plurality of recipients for the publication object, defining a format and a destination for each report template associated with the publication object, and defining a delivery rule for the publication object, where the delivery rule specifies a condition for delivery of distinct reports to the plurality of recipients.

BRIEF DESCRIPTION OF THE FIGURES

The invention is more fully appreciated in connection with the following detailed description taken in conjunction with the accompanying drawings, in which:

FIG. 9 illustrates an example of an interface for defining personalization parameters configured in accordance with an embodiment of the invention.

Like reference numerals refer to corresponding parts throughout the several views of the drawings.

DETAILED DESCRIPTION OF THE INVENTION

Figure 1:
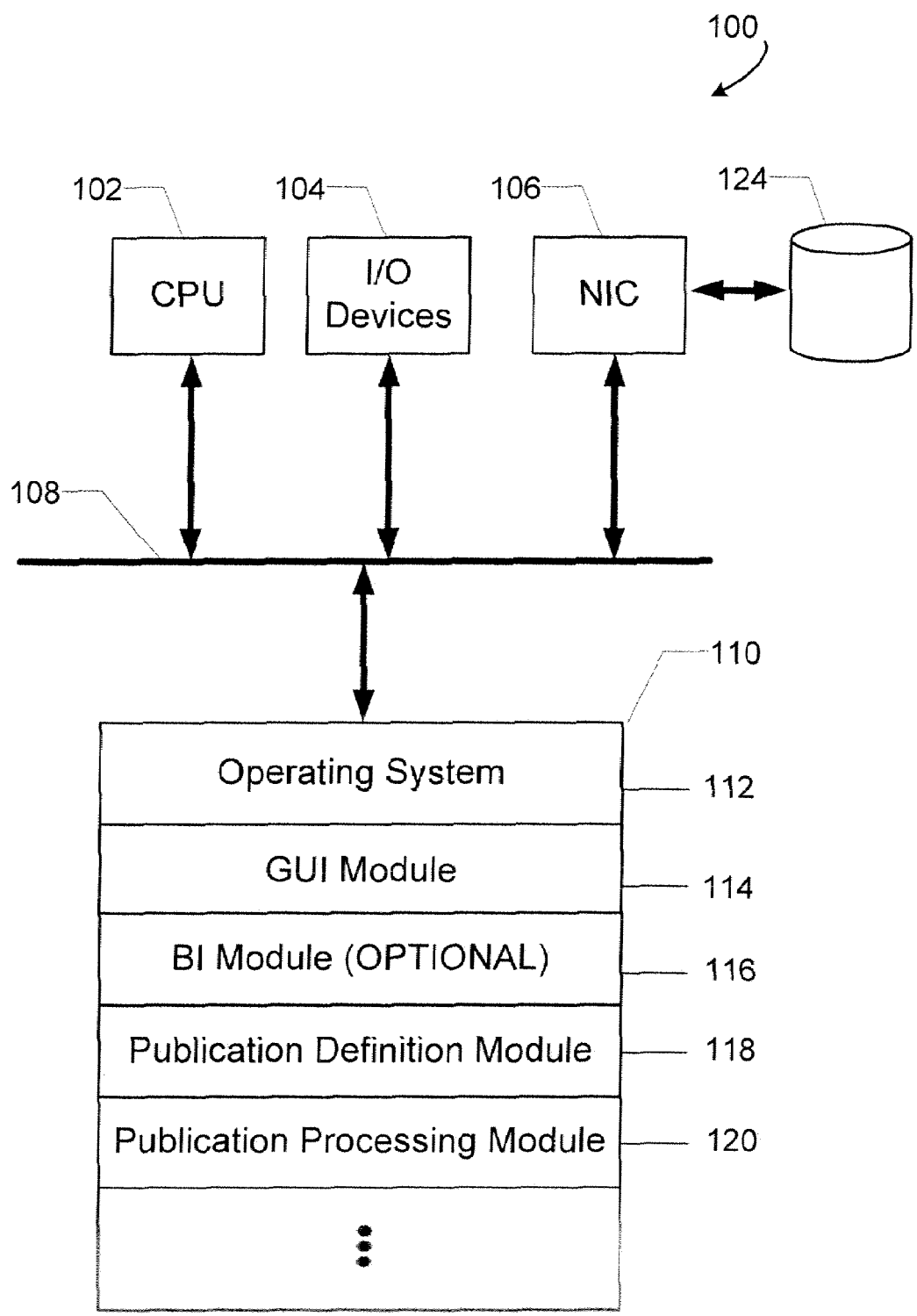
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 108. The input/output devices 104 may include a keyboard, mouse, touch screen, monitor, printer, and the like. A network interface circuit 106 is also connected to the bus 108. The network interface circuit (NIC) 106 provides connectivity to a network (not shown), thereby allowing the computer 100 to operate in a networked environment. For example, networked data source 124 is connected to computer 100 through NIC 106.

A memory 110 is also connected to the bus 108. In an embodiment, the memory 10 stores one or more of the following modules: an operating system module 112, a graphical user interface (GUI) module 114, a business intelligence (BI) module 116, a Publication Definition module 118, and a Publication Processing module 120.

The operating system module 112 may include instructions for handling various system services, such as file services or for performing hardware dependant tasks. The GUI module 114 may rely upon standard techniques to produce graphical components of a user interface, e.g., windows, icons, buttons, menu and the like, examples of which are discussed below.

Optional BI module 116 includes executable instructions to perform BI related functions, such as performing queries and analyses, accessing data sources such as relational and/or multidimensional databases, accessing document storage repositories, and the like. The Publication Definition module 118 includes executable instructions for creating and defining properties for a publication object, including accessing report templates.

The Publication Processing module 120 includes executable instructions to process publication objects such as fetching data, generating reports and publication documents, and evaluating delivery rules and format and destination settings. The module 120 includes executable instructions to generate reports and publication documents according to multiple formats and delivery settings, and to deliver reports and publication documents to multiple recipients.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
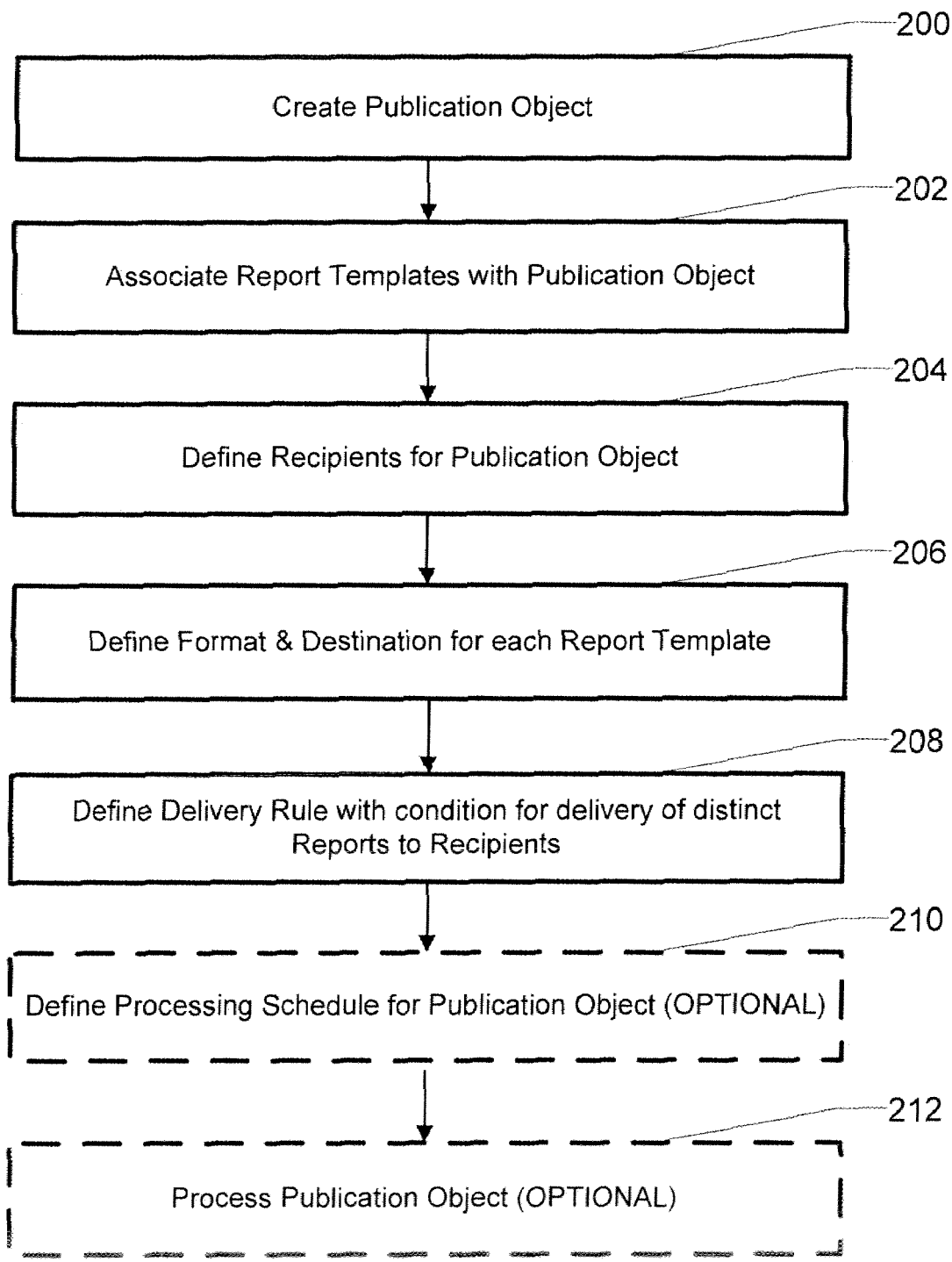
FIG. 2 illustrates processing operations associated with an embodiment of the invention.

FIG. 2 illustrates a series of processing operations in accordance with an embodiment of the invention. The operations of FIG. 2 may be implemented using publication definition module 118 either independently or in conjunction with GUI module 114. Create a publication object 200 creates a new empty publication object and typically includes instructions for specifying a name for the new publication object, and a location for the publication object to be stored. In one embodiment, additional information such as a description and a category for the publication object is also specified. Associate report templates with the publication object 202 allows a user to associate multiple report templates with the publication object in order to provide centralized control bar the publication object of processing and delivery of multiple reports. In one embodiment, report templates of different types may be associated with a publication object, such as Crystal Reports™, WebIntelligence™ and OLAPIntelligence™ report templates.

Define recipients for the publication object 204 allows a user to specify multiple recipients for the reports generated by the publication object. Recipients defined for the publication object include recipient metadata information with at least an identification of the recipient, such as a name or ID number and a report delivery destination for the recipient, such as an email address or a folder on a computer system. In an embodiment of the invention, recipients defined for a publication object can include predefined enterprise recipients and dynamically defined recipients. Predefined enterprise recipients, such as for a corporate computer system or the like, typically include recipient metadata profiles that include additional attributes for a recipient, such as security or permissions settings for the recipient, functional or other groups to which the recipient belongs, additional report delivery destinations for the recipient, and the like. Dynamically defined recipients are typically defined by reference to another source or list of recipient information, such as a mailing list or contact database for example, or may be defined individually by a user.

Define a format and a destination for each report template 206 allows a user to specify one or more generation formats and delivery destinations for reports generated from each report template associated with the publication object. In one embodiment, multiple formats and/or destinations can be defined for reports generated from one report template associated with a publication object. Suitable formats for the generation of reports that can be defined for a publication object include: Crystal Report .rpt, Adobe Acrobat .pdf, Microsoft Word .rtf, rich text format .rtf, Microsoft Word editable .rtf, Microsoft Excel .xls, text .txt, tab separated text .ttx, separated values .csv, XML, and compressed archive file formats. Suitable destinations for delivery of reports that can be defined for a publication object include: email, ftp, business intelligence dashboard, inbox, system folder and repository, and custom destinations. In an embodiment of the invention, defining a format and a destination for each report template includes selecting one or more portions of a particular defined report format to be delivered to the defined destination in a common merged or consolidated publication document.

Define a delivery rule with a condition for delivery of distinct reports to recipients 208 allows a user to specify one or more conditional delivery rules to determine if a distinct report is delivered to one or more defined recipients upon processing the publication object. In one embodiment, the one or more delivery rules include a logical condition depending on an attribute of the recipient. In one example, a delivery rule includes a logical condition specifying that a distinct report will be delivered to a recipient if the recipient's name is equal to a particular value, or if the recipient belongs to a specific group. In another example a delivery rule includes a logical condition that a distinct report will be delivered to a recipient if the recipient has a specific security or permission setting. A delivery rule logical condition for a distinct report is typically defined in the report template for that report. In such a case, the logical condition can be defined relative to a variable or parameter defined in the report template. In an embodiment of the invention, an alert function is used to implement a conditional delivery rule so that a distinct report will be delivered to one or more defined recipients if a condition defined for the alert, such as a logical condition, is triggered. In addition to determining if a distinct report is delivered to one or more defined recipients, a delivery rule logical condition may also determine whether a report will be generated from a report template upon processing the publication object.

Optionally, define processing schedule for publication object 210 allows a user to specify a schedule to determine when, or under what circumstances, the publication object is processed. In one embodiment, the publication object can be scheduled for processing according to a regular time interval, such as daily or weekly or in response to a trigger defined in the schedule, such as the opening of a document, the trigger of an alert, or the satisfaction of a logical condition defined in the schedule. Optional process publication object 212 initiates processing of the publication object to generate and deliver reports as defined for the publication object.

In an optional embodiment of the invention, a personalization filter is defined for the publication object to personalize the generation of one or more reports associated with the publication object relative to one or more recipients. The personalization filter typically specifies one or more recipient attributes, such as recipient name, group or security setting as values for one or more parameters defined in a report template. Upon processing the publication object, the one or more recipient attributes are used to evaluate the one or more parameters in the report template, such that the resulting report is generated according to the personalized parameter values for each recipient.

Figure 3:
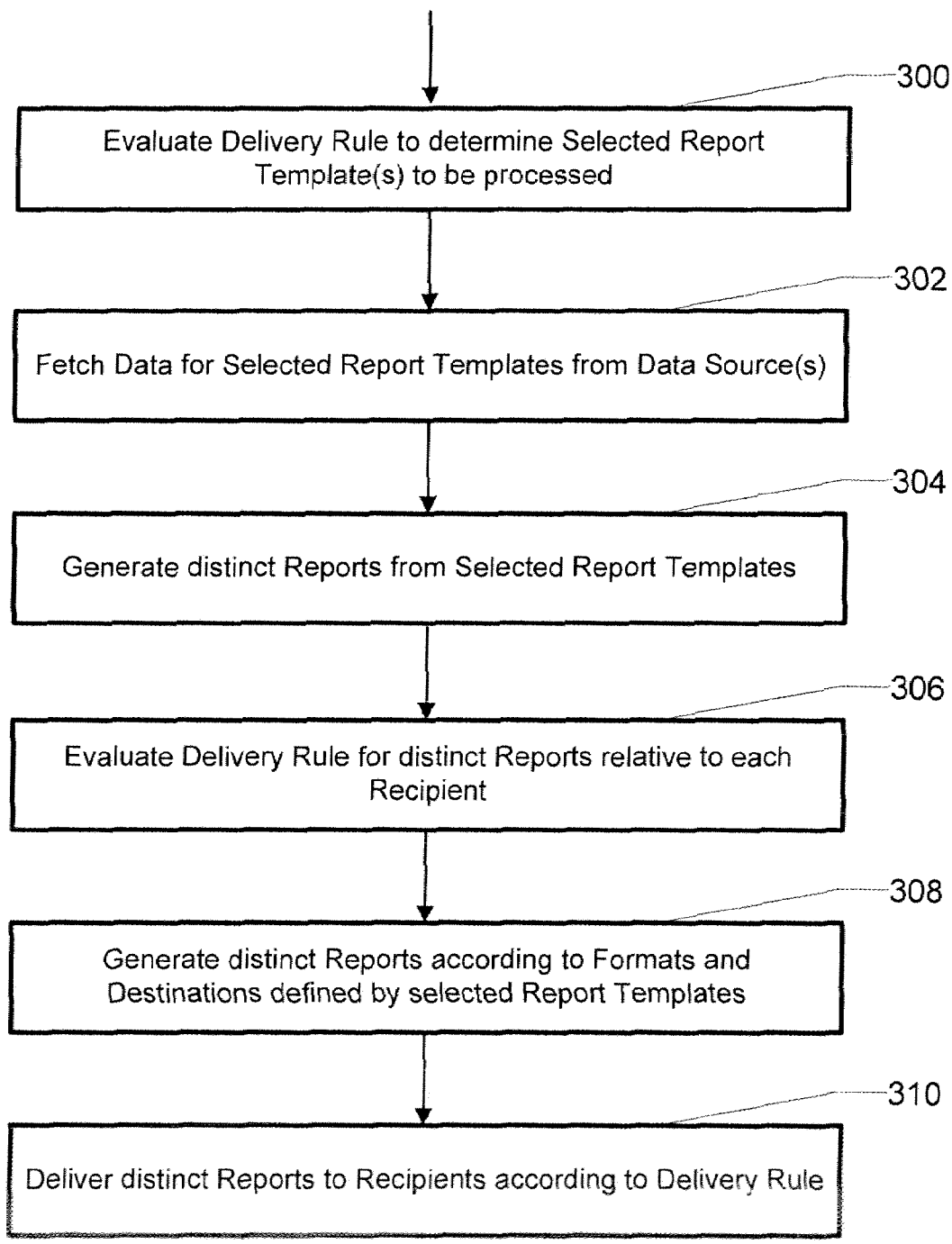
FIG. 3 illustrates operations for processing a publication object associated with an embodiment of the invention.

FIG. 3 illustrates processing operations for processing a publication object in accordance with an embodiment of the invention. The operations of FIG. 3 may be implemented using publication processing module 120, optionally in conjunction with BI module 116. Evaluate the delivery rule to determine one or more selected report templates to be processed 300 analyzes the one or more conditional delivery rules defined for the publication object to specify which report templates are selected for processing. In an alternative embodiment, the evaluation of the one or more conditional delivery rules specifies which report templates will not be processed and any remaining report templates are selected for processing.

Fetch data for selected report templates from one or more data sources 302 executes queries defined by the selected report templates against one or more data sources to return data results for the selected report templates. The definition and execution of queries from the selected report templates may be implemented by any suitable known reporting query engine or system, such as a query engine using a semantic layer or other abstraction layer to formulate queries for execution against one or more data sources, such as networked data source 124. Publication processing module 120 may include instructions to implement such a suitable query engine. In one embodiment, the one or more data sources may include relational databases, OLAP databases, other structured data sources, or combinations thereof.

Generate distinct reports from selected report templates 304 produces distinct reports for each of the selected report templates using the data fetched from one or more data sources in 302. The generation of distinct reports may be implemented using any suitable known reporting engine or system. Publication processing module 120 may include instructions to implement such a suitable reporting engine. Evaluate the delivery rule for distinct reports relative to each recipient 306 analyzes the one or more conditional delivery rules defined for the publication object to specify each recipient that will receive delivery of each distinct report. In one embodiment, a reporting engine included in publication processing module 120 may be used to evaluate the delivery rule 306.

Generate the distinct reports according to the formats and destinations defined by the selected report templates 308 creates documents in the formats defined for each distinct report associated with the publication object in preparation for delivery to recipients via the destinations defined for each report format. In an embodiment of the invention where one or more portions of distinct reports have been selected for inclusion in a common merged or consolidated publication document, the common publication document is created including all such selected portions of reports according to the formats defined in the publication object.

Deliver the distinct reports to the recipients according to the delivery rule 310 conditionally delivers the formatted distinct reports to the recipients subject to the one or more conditions of the delivery rule. The distinct reports are delivered to the recipients at the destinations defined for each report, such as to the recipient's email address, ftp address, and/or business intelligence inbox, for example. In one embodiment where a common merged or consolidated publication document has been created in 308, the publication document is conditionally delivered to recipients subject to the one or more conditions of the delivery rule.

Figure 4:
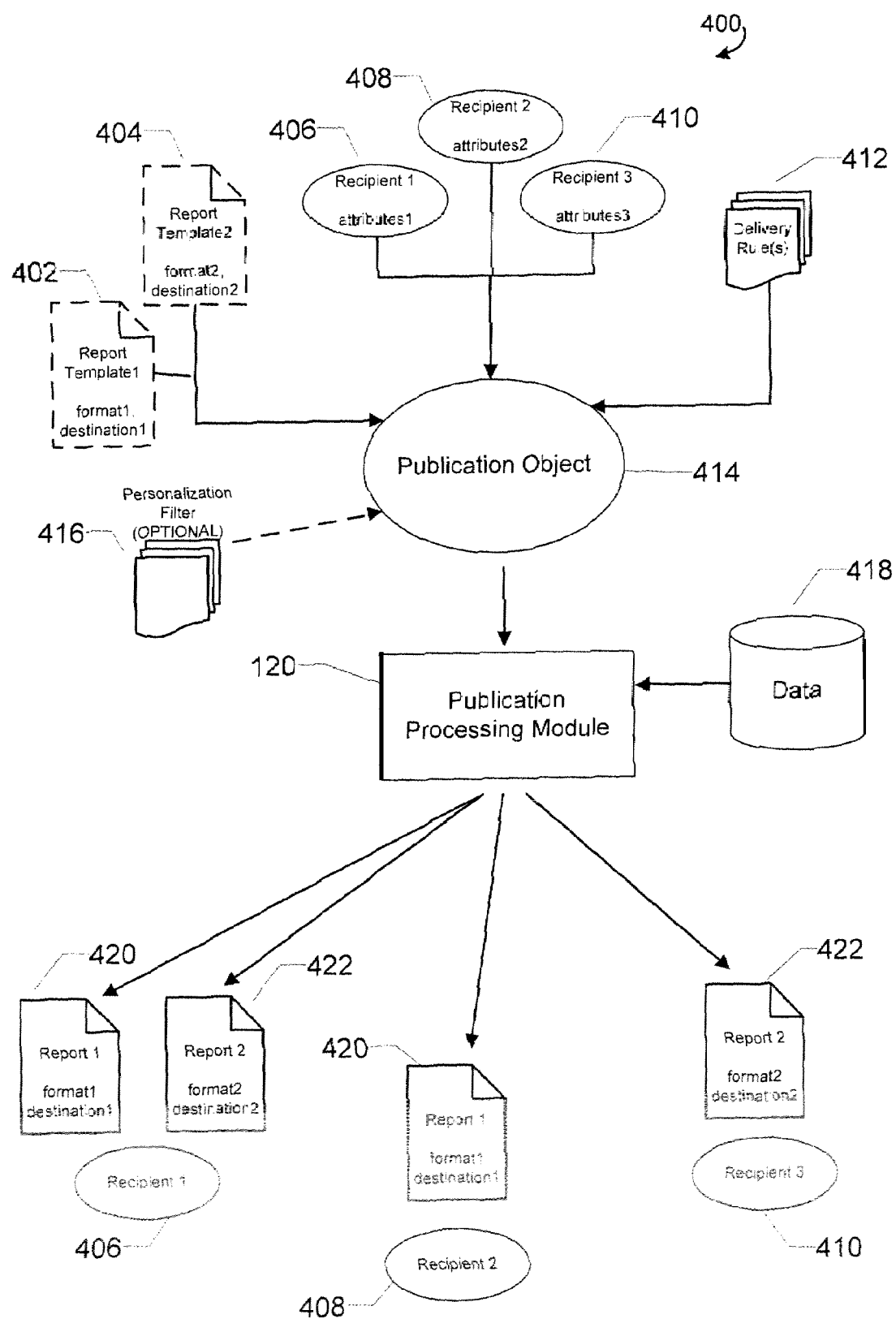
FIG. 4 illustrates an architecture for implementing the processing operations of FIGS. 2 and 3 according to an embodiment of the invention.

FIG. 4 illustrates an architecture for implementing the processing operations of FIGS. 2 and 3 according to an embodiment of the invention. Publication object 414 is associated with multiple report templates, including report template1 402 and report template2 404. Report template 402 and report template2 404 include format and destination definitions for the report templates, including format1 and destination1, and format 2 and destination2, respectively. Publication object 414 includes definitions of multiple recipients for report templates, including recipient1 406, recipient2 408 and recipient3 410, which include recipient attributes, attributes2 and attributes3, respectively. Publication object 414 also includes definitions of one or more delivery rules 412 for determining conditional delivery of report templates to each recipient. Publication object 414 may also optionally include definitions of one or more personalization filters 416 for personalizing the generation of reports for each recipient, such as by providing a recipient attribute value for a report parameter.

The processing of publication object 414 to generate distinct reports and optionally one or more merged or consolidated publication documents is implemented by publication processing module 120. Delivery rules 412 are evaluated to determine that report template1 402 and report template2 404 are selected for processing. Data is fetched from one or more data sources 418 and is used to generate distinct reports report1 420 and report2 422 from report template 402 and report template 2 404, respectively. Delivery rules 412 are further evaluated to determine conditions for delivery of report1 420 and report2 422 to each of recipient1 406, recipient 2 408 and recipient 3 410. Report1 420 is then generated according to format1 for delivery to destination1 and report2 422 is generated according to format2 for delivery to destination2. Finally, according to delivery rules 412, report1 420 and report2 422 are delivered to recipient1 406, report1 420 alone is delivered to recipient2 408 and report2 422 alone is delivered to recipient3 410.

Figure 5:
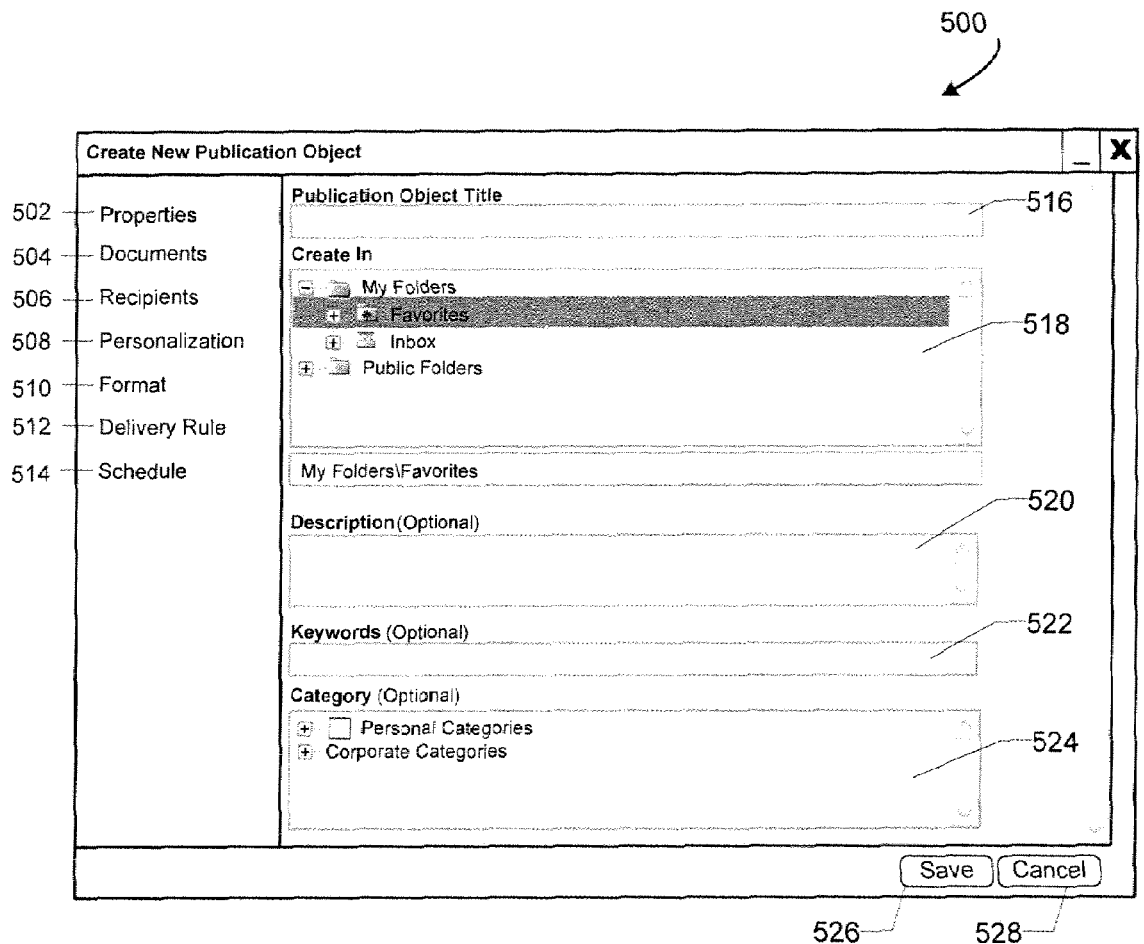
FIG. 5 illustrates an example of an interface for creating a publication object configured in accordance with an embodiment of the invention.

FIG. 5 illustrates an example of an interface 500 or creating a publication object configured in accordance with an embodiment of the invention. Interface 500, and also interfaces 600, 700, 800, 900, 1000 and 1100 in FIGS. 6-11 can be generated by publication definition module 118, optionally in conjunction with GUI module 114, and could be displayed in a window on an output device connected to computer 100 such as a display. Interface 500 includes navigation links 502, 504, 506, 508, 510 and 512 for accessing specific interface screens associated with aspects of defining a publication object. In this case, interface 500 is associated with Properties link 502 for creating a new publication object.

Interface 500 includes publication object title box 516 for defining a name for the new publication object, and "Create In" box 518 for defining a location for the publication object to be stored, such as a folder in a directory tree. Interface 500 also includes optional description box 520 for defining a description of the publication object, optional keyword box 522 for defining one or more keywords for association with the publication object and optional category box 524 for associating the publication object with one or more categories. Finally, interface 500 includes save button 526 for storing the publication object at the location defined in "Create In" box 518, and cancel button 528 for canceling the creation of the publication object.

Figure 6:
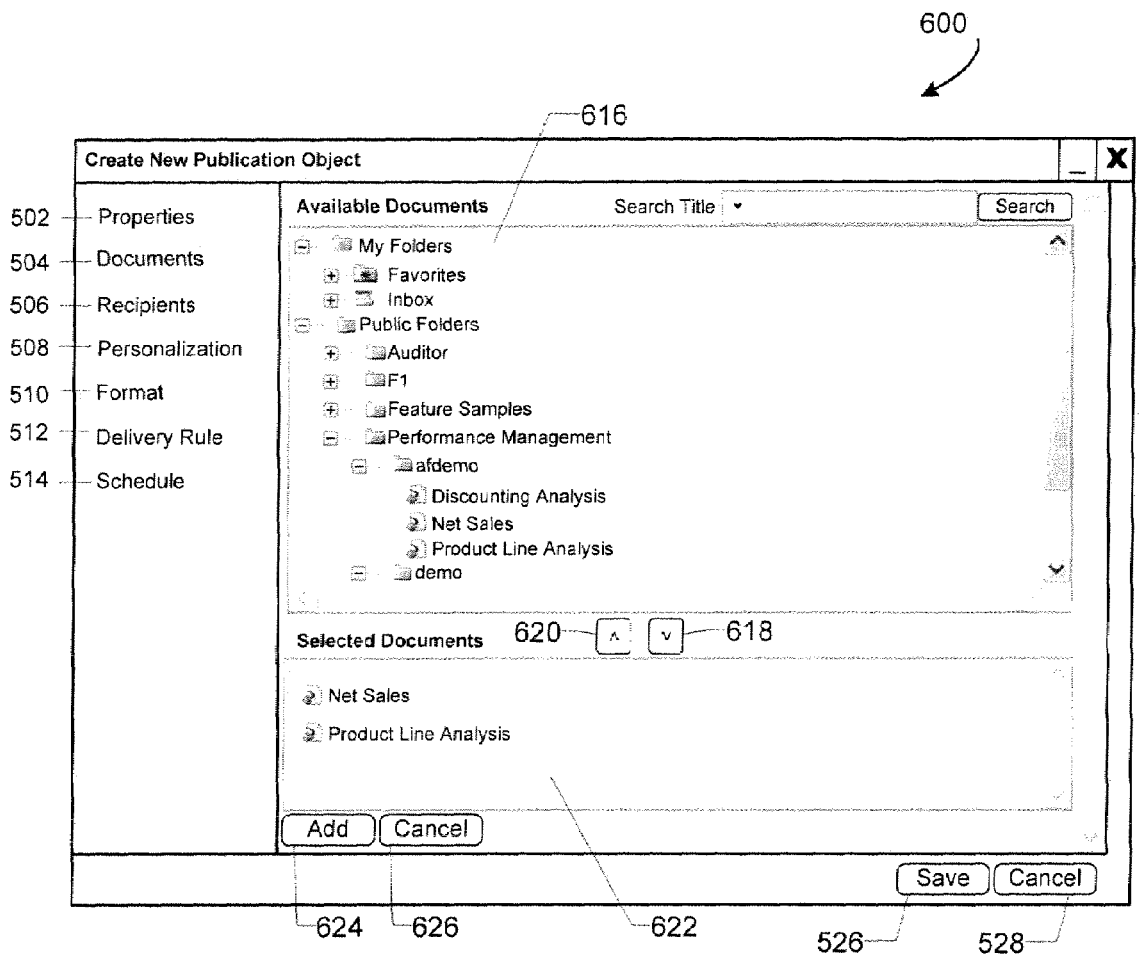
FIG. 6 illustrates an example of an interface for adding report templates configured in accordance with an embodiment of the invention.

FIG. 6 illustrates an example of an interface 600 for associating report templates with a publication object configured in accordance with an embodiment of the invention. Interface 600 includes navigation links 502, 504, 506, 508, 510 and 512 as described above in reference to FIG. 5, and is associated with Documents link 504 for associating report templates with a publication object. Interface 600 includes available documents window 616 for displaying report templates and optionally other documents available for association with the publication object, and allows for navigation of a file directory structure to locate documents. Selected documents window 622 displays report templates and optionally other documents that have been selected for association with the publication object. Documents can be moved to selected documents window 622 from available documents window 616 or vice versa using transfer buttons 618 and 620. Add button 624 is for associating selected report templates and optionally other documents displayed in selected documents window 622 with the publication object, and cancel button 626 is for canceling the association of documents.

Figure 7:
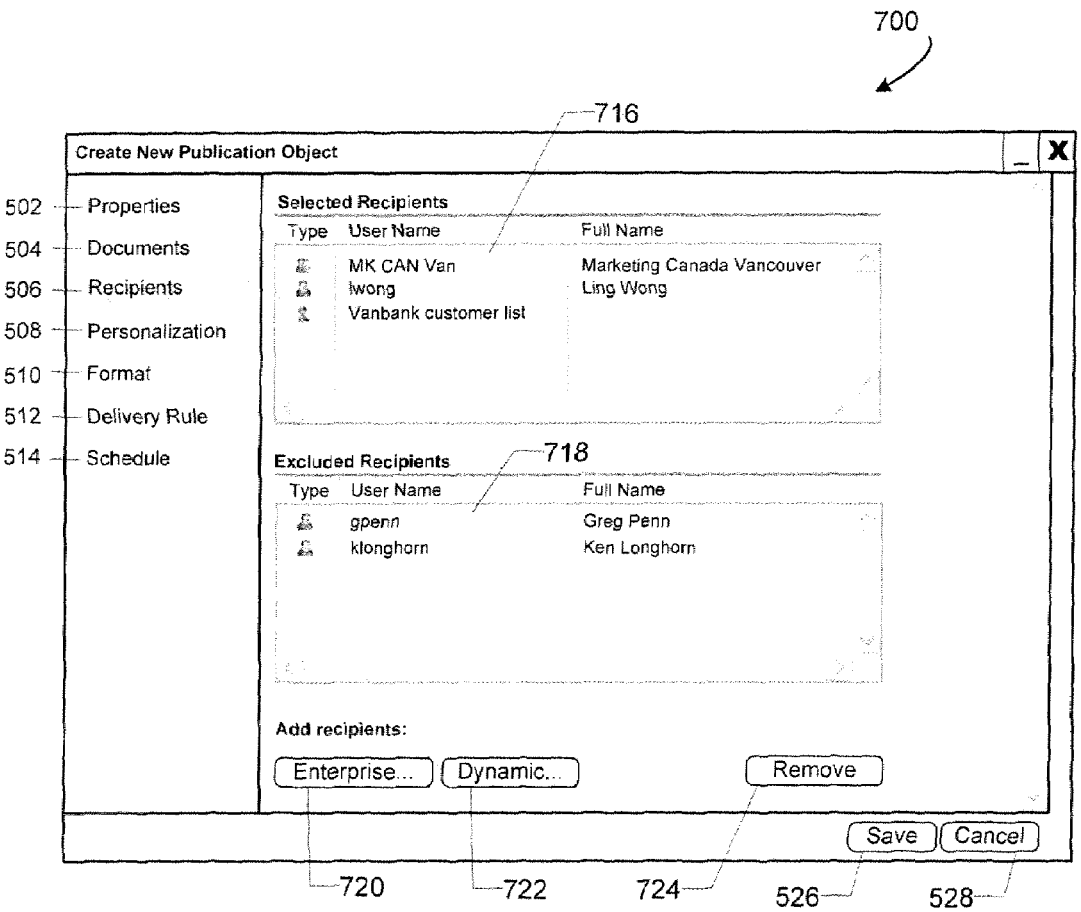
FIG. 7 illustrates an example of an interface for defining recipients configured in accordance with an embodiment of the invention.

FIG. 7 illustrates an example of an interface for defining recipients configured in accordance with an embodiment of the invention. Interface 700 includes navigation links 502, 504, 506, 508, 510 and 512 as described above in reference to FIG. 5, and is associated with Recipients link 506 for defining multiple recipients for a publication object. Selected recipients window 716 displays recipients that are to be added to the publication object Excluded recipients window 718 displays any recipients that are to be excluded from the publication object, such as individual members of a selected recipient group displayed in selected recipients window 716 that are to be excluded from the publication object. Enterprise recipient button 720 activates an interface (not shown) displaying a list of predefined recipients available for selection as recipients for the publication object and allows selection of available recipients which are then displayed in selected recipients window 716. Dynamic recipient button 722 activates an interface (not shown) allowing definition of dynamically defined recipients for the publication object, such as by attaching a mailing list or database, or by entering recipient attribute information. Following definition of dynamic recipients, they are displayed in selected recipients window 716. Remove button 724 removes selected recipients from selected recipients window 716.

Figure 8:
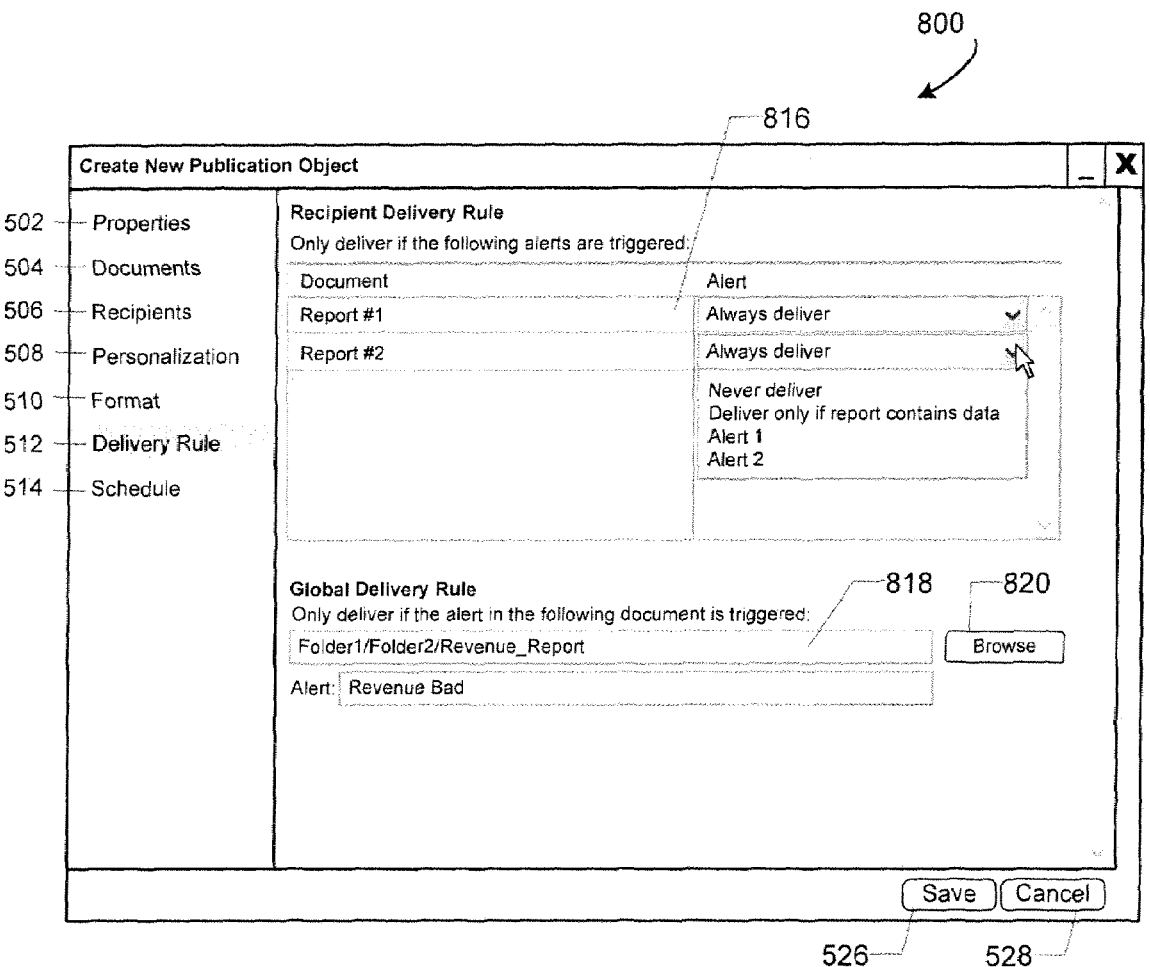
FIG. 8 illustrates an example of an interface for defining delivery rules configured in accordance with an embodiment of the invention.

FIG. 8 illustrates an example of an interface for defining delivery rules configured in accordance with an embodiment of the invention. Interface 800 includes navigation links 502, 504, 506, 508, 510 and 512 as described above in reference to FIG. 5, and is associated with Delivery Rule link 512 for defining delivery rules for a publication object. Recipient delivery rule window 816 displays report templates and optionally other documents associated with the publication object and allows definition of one or more delivery rules for application to each report template or other document. In one embodiment, delivery rules may be selected from logical conditions defined in the report templates, such as alerts for example. Alternatively another interface (not shown) may be provided to define custom delivery rules and conditions for application to one or more report templates or other documents. Global delivery rule box 818 is for adding a global delivery rule condition for use in determining whether reports are to be generated upon processing of the publication object. Browse button 820 opens another interface (not shown) allowing navigation of a file directory and selection of global delivery rules from defined logical conditions, such as alerts defined in a report template. In one embodiment, an interface (not shown) may be provided to define custom global delivery rules and conditions.

Figure 9:
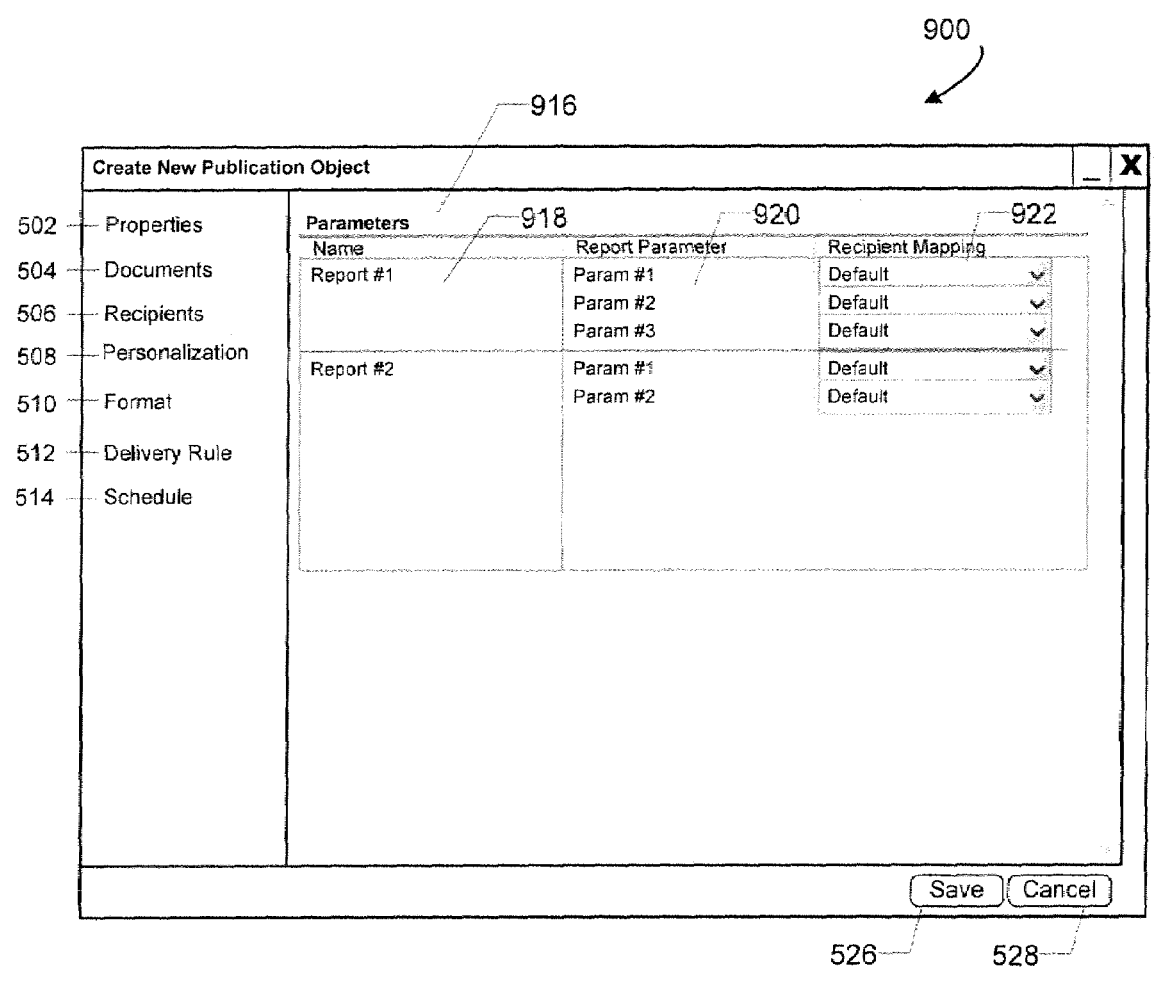

FIG. 9 illustrates an example of an optional interface for defining personalization parameters configured in accordance with an embodiment of the invention. Interface 900 includes navigation links 502, 504, 506, 508, 510 and 512 as described above in reference to FIG. 5, and is associated with Personalization link 508 for defining optional personalization filters or parameters for a publication object. Parameters window 916 displays report templates associated with the publication object in column 918, parameters defined in the report templates available for use as personalization filters in column 920 and recipient attributes selected for use as parameter values in column 922. Dropdown boxes in column 922 allow selection of specific recipient attributes, such as name, group or security setting for example to be used as values for each parameter defined in each report template.

Figure 10:
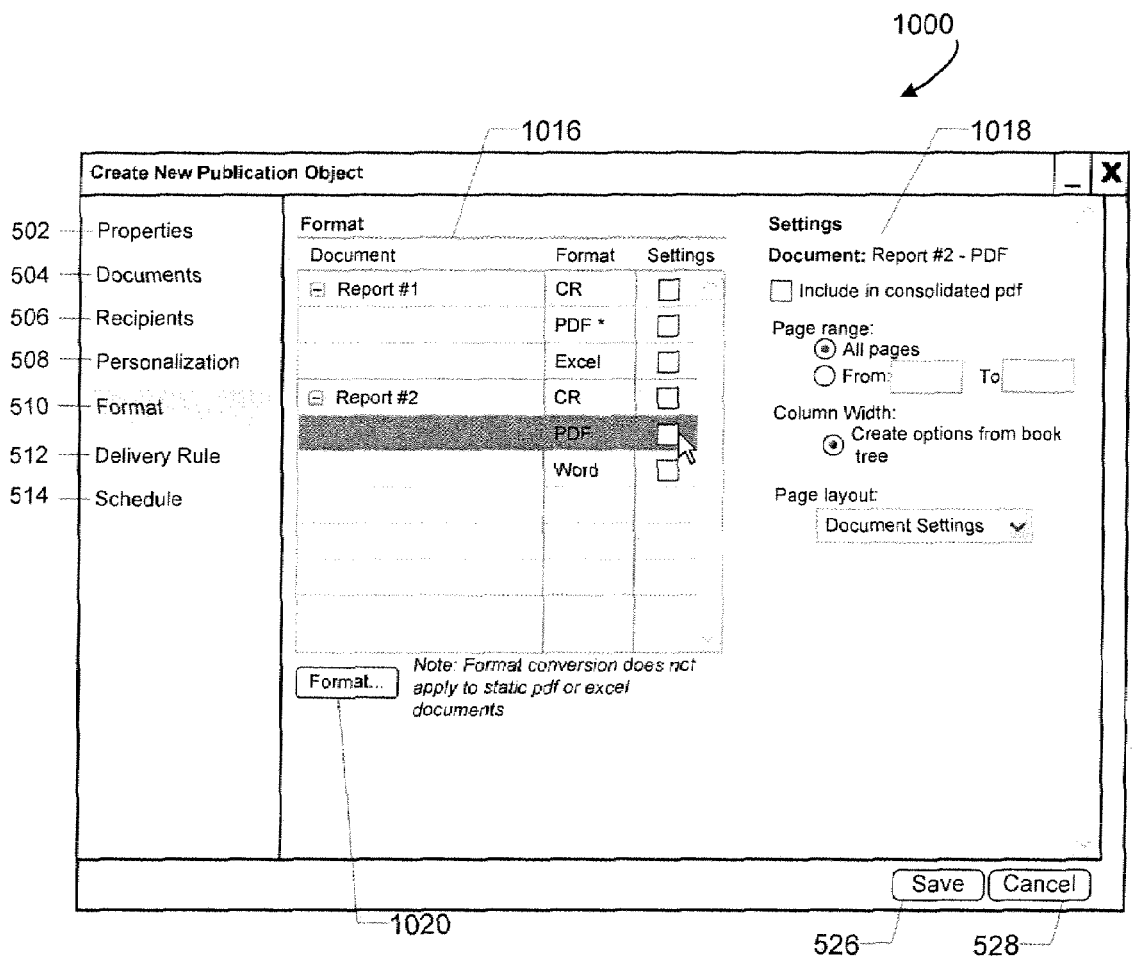
FIG. 10 illustrates an example of an interface for defining report formats configured in accordance with an embodiment of the invention.

FIG. 10 illustrates an example of an interface for defining report formats configured in accordance with an embodiment of the invention. Interface 1000 includes navigation links 502, 504, 506, 508, 510 and 512 as described above in reference to FIG. 5, and is associated with Format link 510 for defining report formats for report templates associated with a publication object. Format window 1016 displays one or more formats selected for each report template associated with the publication object. Format button 1020 activates another interface (not shown) for selecting predefined formats for a report template; selected formats are then displayed for that report template in format window 1016. Settings section 1018 displays available settings options for a specific format of a report template. The option to include a format of a report template in a merged or consolidated publication document and what portion or portions of the format of the report template to include in the publication document can also be specified in settings section 1018.

Figure 11:
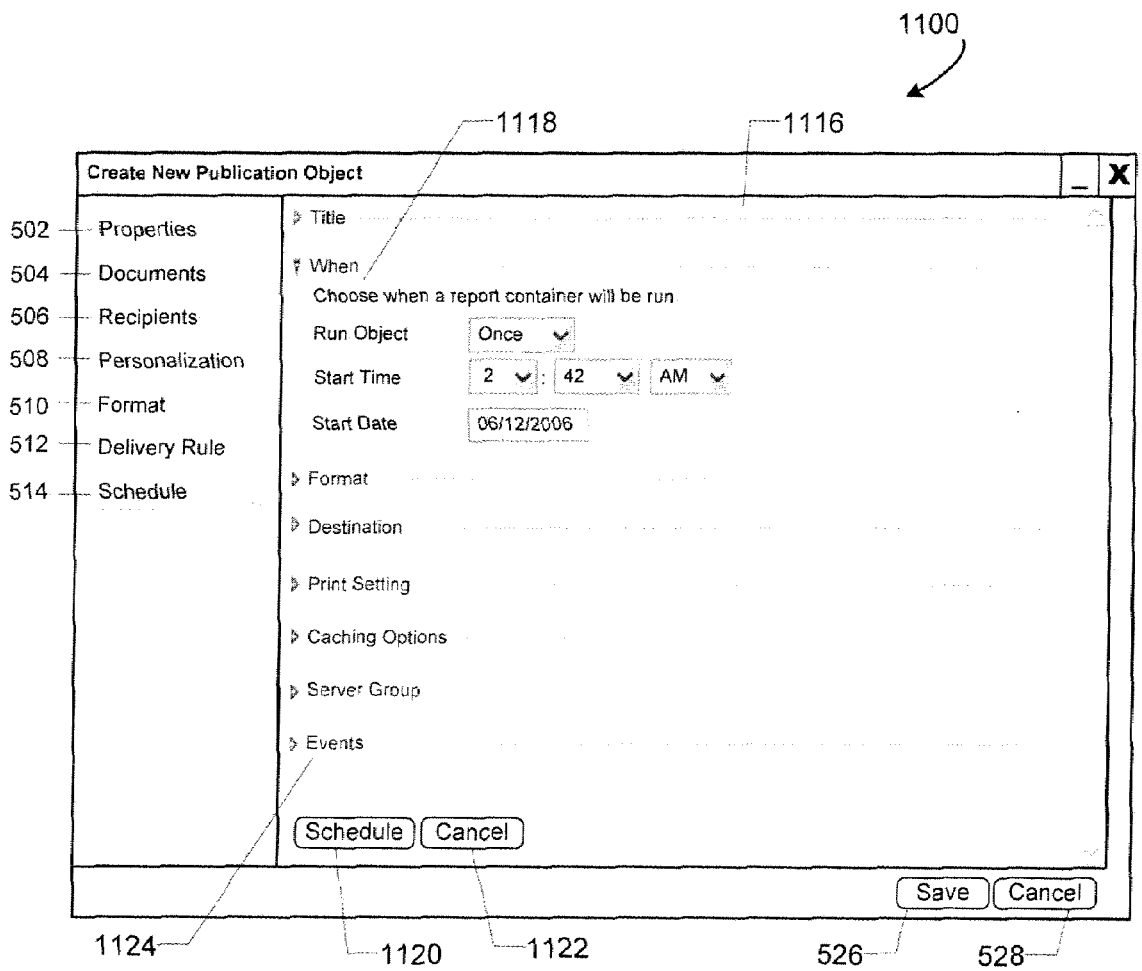
FIG. 11 illustrates an example of an interface for scheduling processing of a publication object configured in accordance with an embodiment of the invention.

FIG. 11 illustrates an example of an optional interface for scheduling processing of a publication object configured in accordance with an embodiment of the invention. Interface 1100 includes navigation links 502, 504, 506, 508, 510 and 512 as described above in reference to FIG. 5, and is associated with Schedule link 514 for defining an optional schedule to determine when a publication object is processed. Publication schedule window 1116 displays collapsible settings sections for defining aspects of scheduling the processing of a publication object such as a time-based settings section 1118 and an event based settings section 1124. Time based settings section 1118 displays options for scheduling either one-time occurrences or regular time intervals for processing the publication object. Schedule button 1120 defines the processing schedule for the publication object according to the settings selected in publication schedule window 1116. Cancel button 1122 is for canceling the definition of a processing schedule.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
   present a user interface to specify a publication object, wherein the user interface includes prompts to receive input, wherein the user interface includes:
      a first screen with a first box to receive a user defined publication object title and a second box to receive a user defined publication object description;
      a second screen to specify report templates;
      a third screen to specify a plurality of recipients to receive customized reports derived from the report templates, wherein the third screen lists potential recipients and receives user input that selects the plurality of recipients from the potential recipients;
      a fourth screen to specify a delivery rule for each customized report, wherein the delivery rule is selected from a list of delivery rules;
   form a publication object based upon the input, wherein the publication object includes a plurality of report names corresponding to a plurality of reports, wherein each report of the plurality of reports includes at least one report parameter and recipient mapping information;
   process the publication object to form the customized reports, wherein the executable instructions to process include executable instructions to process each report of the plurality of reports by retrieving data from a data source and formatting the data in accordance with a report schema; and
   deliver the customized reports to the plurality of recipients.

2. The computer readable storage medium of claim 1 further comprising executable instructions to define a processing schedule for the publication object.

3. The computer readable storage medium of claim 1 further comprising executable instructions to define a personalization filter for the publication object, wherein the personalization filter specifies an attribute associated with a recipient as a value for a parameter defined in a report template.

4. The computer readable storage medium of claim 1 further comprising executable instructions to generate a publication document, wherein the publication document is a merged document including at least a portion of two or more customized reports.

5. The computer readable storage medium of claim 1 further comprising executable instructions to receive at the user interface a customized report output format selected from: Crystal Report .rpt, Adobe Acrobat .pdf, Microsoft Word .rtf, rich text format .rtf, Microsoft Word editable .rtf, Microsoft Excel .xls, text .txt, tab separated text .ttx, separated values .csv, XML, and compressed archive file formats.

6. The computer readable storage medium of claim 1 wherein the destination is selected from the list comprising: email, ftp, business intelligence dashboard, inbox, system folder and repository, and custom destinations.

7. The computer readable storage medium of claim 1 further comprising executable instructions to:
   add at least one static document to the publication object; and
   define a format and a destination in the publication object for each static document.

* * * * *